(12) United States Patent
Itoi

(10) Patent No.: US 7,551,332 B2
(45) Date of Patent: Jun. 23, 2009

(54) DOCUMENT READING APPARATUS

(75) Inventor: Hiroshi Itoi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 526 days.

(21) Appl. No.: 11/386,764

(22) Filed: Mar. 23, 2006

(65) Prior Publication Data

US 2006/0215236 A1 Sep. 28, 2006

(30) Foreign Application Priority Data

Mar. 24, 2005 (JP) .............................. 2005-086838

(51) Int. Cl.
*H04N 1/04* (2006.01)
*G03G 15/00* (2006.01)

(52) U.S. Cl. .................. 358/497; 358/474; 358/471; 399/362; 399/379; 399/380; 355/25

(58) Field of Classification Search ................. 358/497, 358/474, 471, 505; 399/362, 379, 380; 355/25; 250/234–236, 239
See application file for complete search history.

(56) References Cited

U.S. PATENT DOCUMENTS

| | | | | |
|---|---|---|---|---|
| 3,395,610 A | * | 8/1968 | Evans et al. ................. | 399/200 |
| 4,143,960 A | * | 3/1979 | Tracy ........................... | 399/372 |
| 5,012,275 A | * | 4/1991 | Bock ............................ | 355/25 |
| 5,053,819 A | * | 10/1991 | Malyon et al. .............. | 399/362 |
| 5,526,098 A | * | 6/1996 | Peck et al. ................... | 399/362 |
| 6,195,152 B1 | * | 2/2001 | Hyman ......................... | 355/25 |
| 6,459,510 B1 | * | 10/2002 | Brewer et al. ............... | 358/497 |
| 2007/0019253 A1 | * | 1/2007 | Huang ......................... | 358/474 |

FOREIGN PATENT DOCUMENTS

| | | |
|---|---|---|
| JP | 5-50865 U | 7/1993 |
| JP | 2001-24843 A | 1/2001 |
| JP | 2001-75194 A | 3/2001 |

* cited by examiner

*Primary Examiner*—Cheukfan Lee
(74) *Attorney, Agent, or Firm*—Crowell & Moring LLP

(57) ABSTRACT

A document reading apparatus has a slit along one side of a document support platen of a glass plate to insert one part of an opened book as a document to be read. An insertion pocket forming a recessed space contiguous with the slit and inclined diagonally is provided in the apparatus. A lid is operable between open and closed positions exposing and covering the slit. In the open position, one part of a book can be inserted into the slit with a page in the other part of the book being in intimate contact with the platen, while in the closed position, a sheet as a document can be placed at a proper position on the platen by contacting one side of the sheet to a rim of the lid. This apparatus prevents a problem of image deformation and black image in print output when reading the book.

2 Claims, 4 Drawing Sheets

DOCUMENT READING APPARATUS

BACKGROUND OF THE INVENTION

1. Field of the Invention

The present invention relates to a document reading apparatus to read a document for an image processing apparatus such as a scanner, a printer and a copier.

2. Description of the Related Art

A document reading apparatus is known which comprises a housing having on an upper surface thereof a document support platen formed of a transparent glass plate for supporting a document, and which also comprises a document reading unit provided in the housing and including a CIS (Contact Image Sensor) for scanning and reading a document placed on the document support platen. For example, each of Japanese Laid-open Patent Publications 2001-24843 and 2001-75194 discloses a document reading apparatus with an document pressing device for applying pressure to the surface of a document so as to bring the document in intimate contact with a contact glass plate, thereby preventing the document, even if e.g. partially curled, from locally rising away from the document support platen.

The above-described conventional document reading apparatus are basically suited to read a document in sheet form, but not in book form, as will be described in detail below. FIG. 6 is a schematic perspective view of a scanner as a representative conventional document reading apparatus which corresponds to the above-described patent publications, and which has a document support platen G supporting a book BD to be opened and read as a document placed thereon. Referring to FIG. 6, when the book BD is opened and placed on the document support platen G formed of a transparent glass plate, the book BD in the middle (at the spine) between adjacent open pages is most likely to stay away from intimate contact with the document support platen G, so as to locally rise away from the document support platen G. An image of a page of the book BD read using this scanner causes a resultant printed image at the risen portion of the book BD to be deformed (distorted) or black due to loss of light reflected from the book BD, preventing a good print image.

For solving this problem and obtaining a good print image, pressure P may sometimes be applied onto the spine of the book BD from above to press the book BD downward to the document support platen G However, this may damage the book BD, and may not be able to completely solve the problem of the black image and the image deformation.

SUMMARY OF THE INVENTION

An object of the present invention is to provide such a document reading apparatus that is suited to read a book as a document, and that allows a desired page of the book to be in intimate contact with a document support platen so as to read the page to output a good print image without causing a problem of e.g. image deformation and black image due to loss of light reflected from the book BD.

According to the present invention, the above object is achieved by a document reading apparatus for reading a document, comprising: a housing; a document support platen formed of a transparent glass plate provided on an upper surface of the housing for supporting a document; a document reading unit provided under the document support platen in the housing for reading the document placed on the document support platen; and a slit opening into which one part of an opened book, as the document, can be inserted, and which is formed along and between one side of the housing and one side of the document support platen.

The document reading apparatus according to the present invention for reading a document makes it possible to insert one part (one part of pages) of a book, as a document, can be inserted to the slit opening so as to allow a desired page of the book, as the document, to be in intimate contact with the document support platen, thereby preventing a problem of e.g. image deformation and black image due to loss of light reflected from the document (book) in print output based on the image read by the document reading apparatus.

Preferably, the document reading apparatus further comprises an insertion pocket forming a recessed space which is contiguous with the slit opening at one end thereof, and which is inclined relative to the vertical to stay away from the document reading unit. A sheet as a document can be inserted by a user into, and can stay in, the insertion pocket from which the sheet can be taken out by the user.

Further preferably, the document reading apparatus further comprises an openable lid member which is provided at the slit opening, and which has a shape corresponding to the slit opening, and further has a rim to position a document. The lid member is operable between an open position to expose the slit opening and a closed position to cover the slit opening, such that in the open position of the lid member, one part of a book as the document can be inserted into the slit opening with a page in the other part of the book being in intimate contact with the document support platen, while in the closed position of the lid member, a sheet as the document can be placed at a proper position on the document support platen by contacting one side of the sheet to the rim of the lid member.

This arrangement is advantageous because the document reading apparatus can adapt well to both book and sheet as documents due to the provision of the lid member. When the sheet is placed on the document support platen, the sheet can be easily placed at a proper position on the document support platen because one side of the sheet can be contacted to the rim of the lid member at the slit opening.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
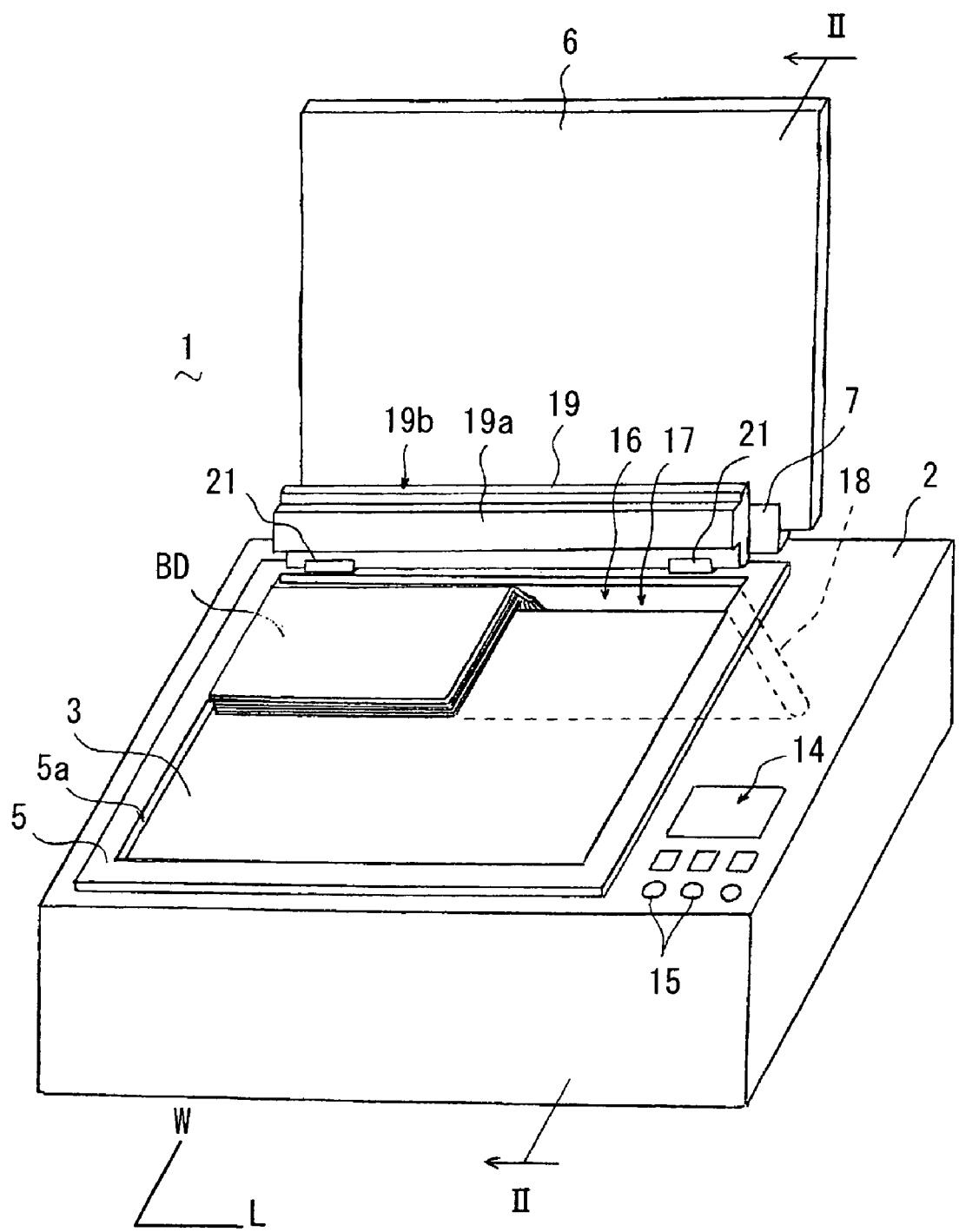
FIG. 1 is a schematic perspective view of a scanner as a document reading apparatus according to an embodiment of the present invention which has a document support platen supporting an opened book as a document placed thereon.

Embodiments of the present invention, as the best mode for carrying out the invention, will be described hereinafter with reference to the annexed drawings. Note that like parts are designated by like reference numerals or reference characters throughout the drawings. It is to be understood that the embodiments described herein are not intended as limiting, or encompassing the entire scope of, the invention.

Figure 2:
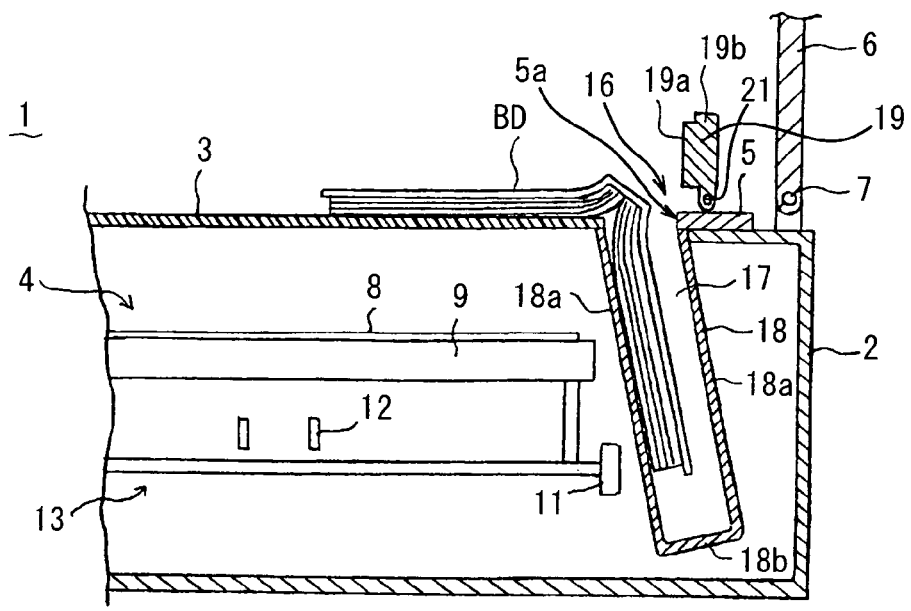
FIG. 2 is a schematic cross-sectional view of a part of the scanner taken along line II-II of FIG. 1.
Figure 3:
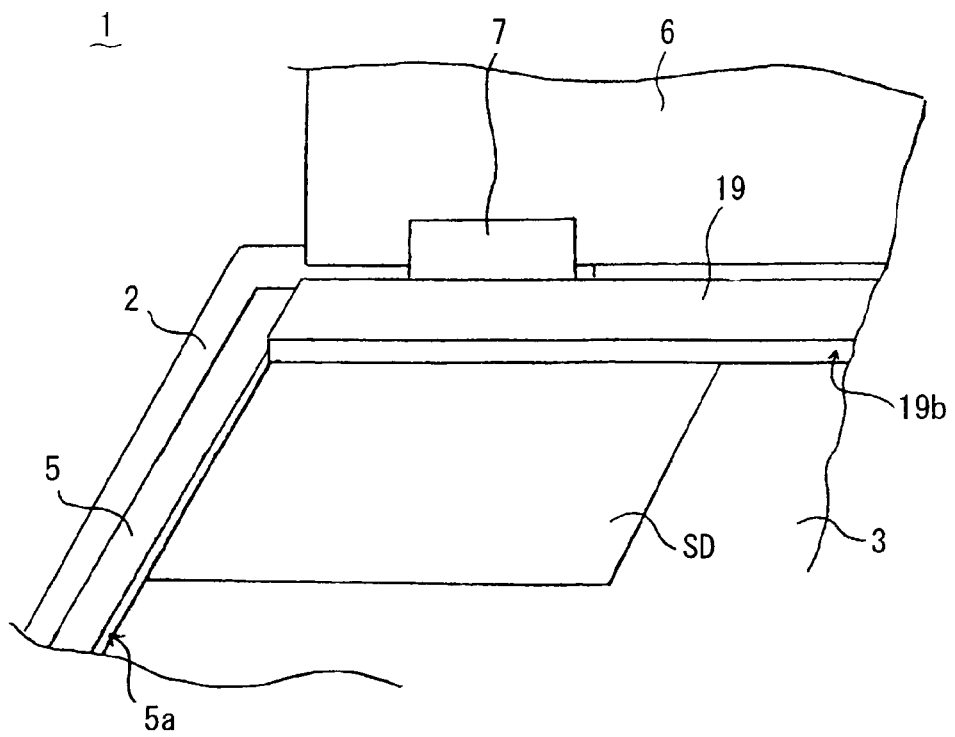
FIG. 3 is a schematic perspective view of a part of the scanner, in which a sheet as a document is placed on the document support platen instead of the book.

FIG. 1 is a schematic perspective view of a scanner 1 as a document reading apparatus according to an embodiment of the present invention which has a document support platen 3 supporting a book BD as a document placed thereon, while FIG. 2 is a schematic cross-sectional view of a part of the scanner 1 taken along line II-II of FIG. 1. On the other hand, FIG. 3 is a schematic perspective view of a part of the scanner 1, in which a sheet SD as a document is placed on the document support platen 3 instead of the book BD. In the present specification, the term "document", which can also be referred to as "original", can be in sheet form, book form or the like so as to be placeable on a document support platen 3, and so as to be scannable and readable. Referring to FIGS. 1 to 3, the scanner 1 comprises a housing 2 of a substantially rectangular parallelepiped shape having, on an upper surface thereof, a document support platen 3 formed of a transparent glass plate to support a document. The scanner 1 further comprises a document reading unit 4 provided in the housing 2 under the document support platen 3 and including a CIS (Contact Image Sensor) 8 for scanning and reading a document on the document support platen 3.

The scanner 1 is connected to, and outputs digital data of the scanned and read document to, e.g. a printer (not shown) provided outside the scanner 1. A frame member 5 to define between the glass plate of the document support platen 3 and the housing 2 is provided at the periphery of the document support platen 3 on the upper surface of the housing 2. The frame member 5 has four inner surfaces 5a one of which contacts one side of a document so as to properly position and align the document on the document support platen 3. The scanner 1 further comprises a cover member 6 coupled to an upper surface of the housing 2 by a hinge 7 so as to be opened and closed between an open position, in which the cover member 6 stands up to open the upper surface of the document support platen 3 and a closed position in which the cover member 6 lies flat substantially horizontally to cover the document support platen 3.

The document reading unit 4 for reading a document comprises: a CIS 8; and a scan drive unit 13, including a carriage 9, a guide rail 11 and a drive belt 12, for moving the CIS 8 to scan along the length (direction L shown in FIG. 1) of the document support platen 3. The scanner 1 has an operation panel 14 and operation keys 15 to be used by a user to operate the scanner 1. Both the CIS 8 and the scan drive unit 13 used here are well-known per se. When a document is placed on an appropriate position of the document support platen 3, and the cover member 6 is closed, and thereafter the operation keys 15 are appropriately operated by a user, the CIS 8 and the scan drive unit 13 operate to automatically scan and read a document on the document support platen 3. A feature of the scanner 1 according to the present embodiment is that the scanner 1 comprises a slit opening 16 along a side of the document support platen 3 as described next, so as to make it possible to bring a desired page of a book BD, as a document, in intimate contact with the document support platen 3.

More specifically, the scanner 1 comprises a slit opening 16 into which one part of an open book BD, as a document, can be inserted, and which is formed along and between one side of the housing 2 (more specifically one side of the frame member 5) and one side of the document support platen 3 (more specifically one side of the glass plate forming the document support platen 3). The slit opening 16 according to the present embodiment has a sufficient width (in direction W shown in FIG. 1) of e.g. 3 to 4 cm to allow a book BD as a document having a considerably large thickness to be easily inserted. The scanner 1 further comprises a recessed space 17 which is contiguous with the slit opening 16 at an end thereof, and which is inclined relative to the vertical, i.e. extends diagonally downward, to stay away from the document reading unit 4.

As shown in FIG. 2, the recessed space 17 is formed by an insertion pocket 18 which is inclined relative to the vertical in the housing 2, and which has side walls 18a and a bottom wall 18b forming a U-shaped cross-section as shown therein. Each of the side walls 18a of the insertion pocket 18 is connected at an end thereof to the document support platen 3 (transparent glass plate), i.e. the upper surface of the housing 2, thereby forming the slit opening 16. The insertion pocket 18 is made of synthetic resin molded to allow the side walls 18a to have a smooth inner surface.

Due to the smooth inner surface and the diagonally downward inclination of the insertion pocket 18, one part of the book BD as the document can be smoothly inserted into and removed from the insertion pocket 18 or the recessed space 17. If the document reading unit 4 has a larger width (in direction W shown in FIG. 1), and extends farther to the right, than that shown in FIG. 2, then the inclination of the insertion pocket 18 (recessed space 17) is to be greater by an amount corresponding to the larger width of the document reading unit 14. The scanner 1 further comprises an elongated openable lid member 19 which is provided at the slit opening 16, and which, more specifically, is coupled to one side of the frame member 5 along the slit opening 16 by a hinge 21 so as to be opened and closed between an open position, where the lid member 19 exposes the recessed space 17, and a closed position where the lid member 19 covers the slit opening 16.

This lid member 19 is operated between the open position and the closed position mainly for adapting to the kinds of document to be placed on and read by the scanner 1, i.e. depending on a document in book form as described above and a document in sheet form as described later, respectively. The lid member 19 has an elongated projection 19a on a lower surface thereof to fit in the slit opening 16 at the closed position, i.e. when the lid member 19 covers the slit opening 16 by lying flat horizontally. The elongated projection 19a is a portion of the lid member 19 having a shape corresponding to the slit opening 16. The lid member 19 further has an elongated rim 19b extending exactly parallel to an inner surface 5a of the frame member 5.

The scanner 1 according to the present embodiment having the structure described above operates as follows. As shown in FIGS. 1 and 2, when a desired page of a book BD as a document is to be read, a user opens the lid member 19 to expose the slit opening 16, and inserts one part of the book BD into the insertion pocket 18 through the slit opening 16 with the desired page of the book BD, to be scanned and read, in the other part of the book BD facing and being in intimate contact with the document support platen 3 (glass plate). The user then presses a predetermined one of the operation keys 15 for the scanner 1 to perform a reading operation.

Figure 6:
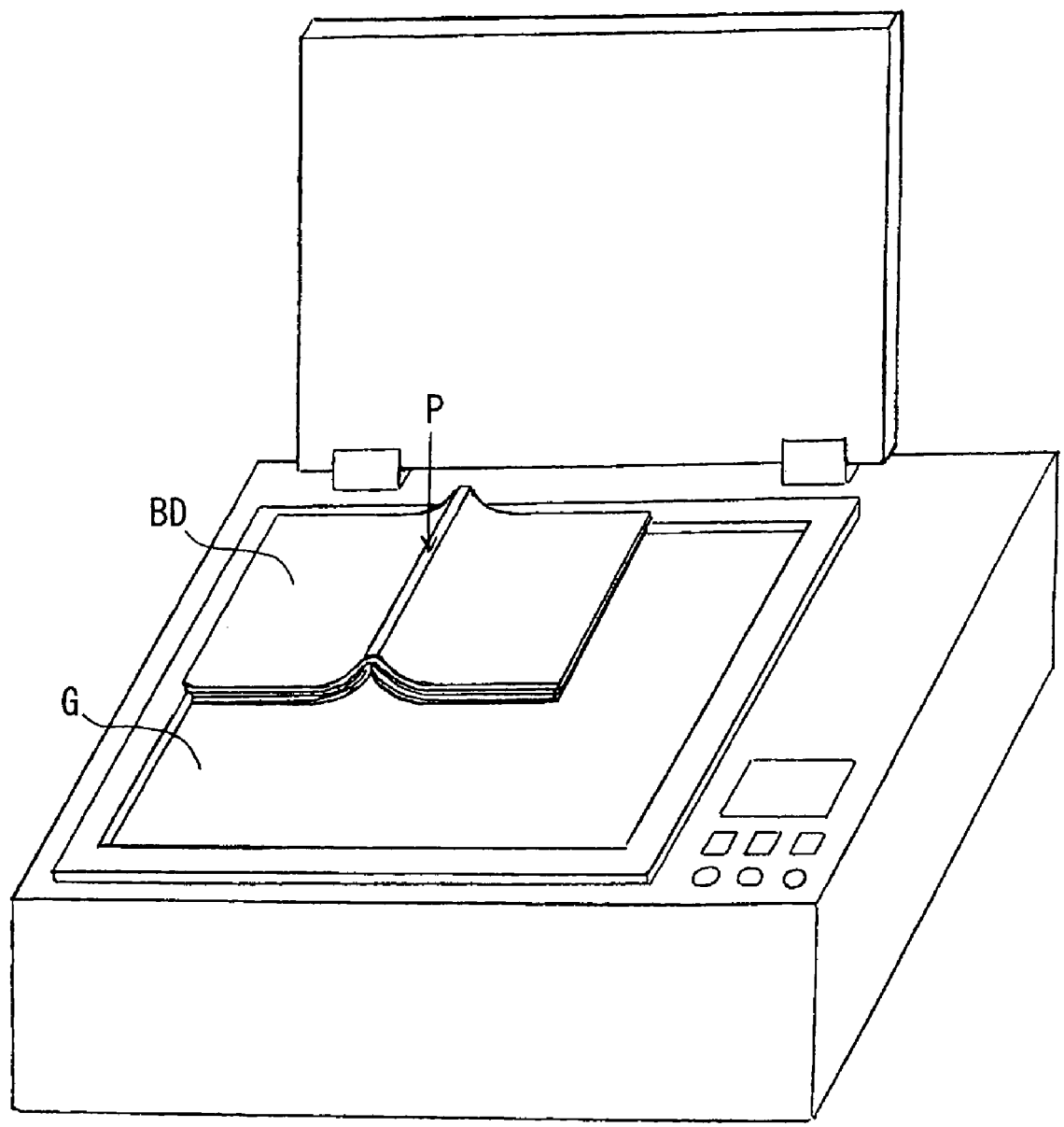
FIG. 6 is a schematic perspective view of a scanner as a conventional document reading apparatus which has a document support platen supporting an opened book as a document placed thereon.

At this time, the page of the book BD in its substantial entire area is in intimate contact with the document support platen 3. More specifically, as compared with the conventional scanner shown in FIG. 6, the desired page of the book BD, to be scanned and read, lies flat on the document support platen 3 to a position of the page nearer to the middle between the adjacent open pages, or nearer to the spine of the book BD, in the case of the scanner 1 according to the present embodiment. Accordingly, a resultant print of the page based on an image of the page read by the reading operation is substantially free of black image due to loss of light reflected from the book BD without image deformation (distortion) of e.g. characters and graphics. When the user lifts up the book BD as a document with both hands after the completion of the scanning and reading of the desired page, the inserted part of the book BD can be smoothly removed from the insertion pocket 18.

On the other hand, as shown in FIG. 3, when a sheet SD as a document is to be scanned and read, the user closes the lid member 19 to cover and close the slit opening 16, and then places the sheet SD at a proper position on the document support platen 3 by contacting two adjacent sides, or at least one of the two sides, of the sheet SD to one of the inner surfaces 5*a* of the frame member 5 and/or to the elongated rim 19*b* of the lid member 19, respectively. Thus, not only the inner surfaces 5*a* of the frame member 5, but also the elongated rim 19 of the lid member 19 serves to position the sheet SD. Thereafter, the user closes the cover member 6, and presses a predetermined one of the operation keys 15 for the scanner 1 to perform a reading operation. Besides, even if the sheet SD erroneously falls into the insertion pocket 18 when the lid member 19 is open, the sheet SD can stay in the insertion pocket 18 because the insertion pocket 18 has the bottom wall 18*b*, so that the sheet SD can thereafter be taken out from the insertion pocket 18 by the user.

Note that although the lid member 19 shown in the above embodiment is coupled to one side of the frame member 5 along the slit opening 16 by the hinge 21 so as to be opened and closed between an open position and a closed position, various modifications of the lid member are possible. For example, although not shown, an elongated slidable plate member which slidingly moves between an open position and a closed position can be used in place of the combination of the lid member 19 and the hinge 21.

More specifically, the elongated slidable plate member can be one that slides on an upper surface of the casing 2, i.e. on the document support platen 3, between a closed position, where the elongated slidable plate member is positioned on and covers the slit opening 16, and an open position where the elongated slidable plate member is positioned e.g. in the vicinity of the cover member 6 and exposes the slit opening 16. This elongated slidable plate member is advantageous because the elongated slidable plate member does not obstruct the cover member 6 from substantially covering the document support platen 3 in contrast to the lid member 19 e.g. in the case where a book BD is placed on the document support platen 3 as a document to be scanned and read, thereby enabling more intimate contact of the document to the document support platen 3, and allowing light to be reflected even from an area of the cover member 6 around the document when scanning and reading the document.

Figure 4:
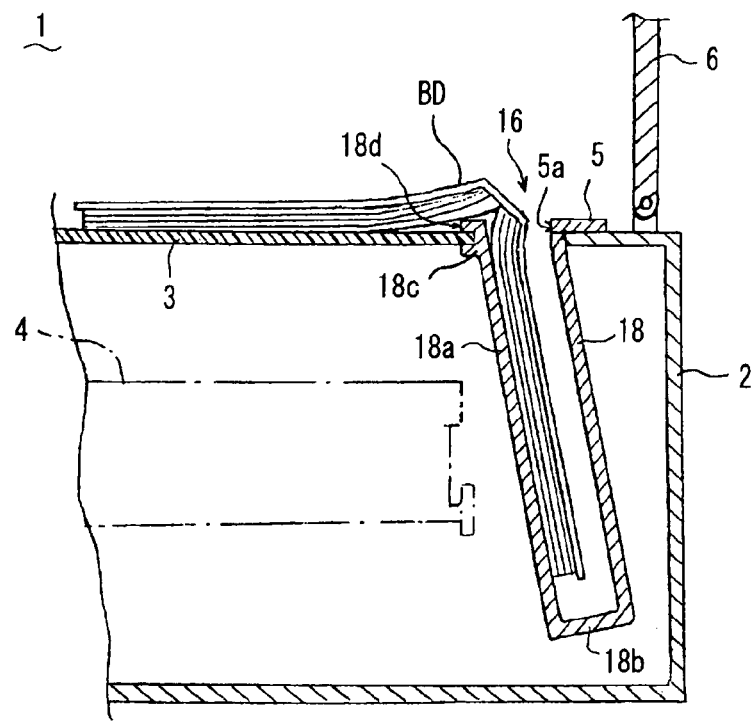
FIG. 4 is a schematic cross-sectional view of a part of a modified scanner according to a further embodiment of the present invention, which is modified in the way of e.g. forming a side wall of an insertion pocket.

Also note that various modifications are possible in the way of e.g. forming the side walls 18*a* of the insertion pocket 18 to form the recessed space 17 and to make the lid member 19 unnecessary. An example of a modified scanner 1 is shown in FIG. 4, which shows a schematic cross-sectional view of a part of the modified scanner 1 according to a further embodiment of the present invention, which corresponds to the part of the above-described scanner 1. Referring to FIG. 4, one side wall 18*a* of the insertion pocket 18 of the modified scanner 1 is formed to have a U-shaped cross section 18*c* at an end thereof into which an end periphery of the glass plate of the document support platen 3 is fit. The modified scanner 1 is the same as the scanner 1 described above with reference to FIGS. 1 and 2, except that one side wall 18*a* of the modified scanner 1 is modified in the way described here, and that the modified scanner 1 has no lid member 19.

Here, one leg of the U-shaped cross section of the one side wall 18*a* of the insertion pocket 18 on the upper surface of the glass plate of the document support platen 3, that is an upper elongated segment of the cross-sectionally U-shaped end of the one side wall 18*a*, is formed to have an elongated outer surface 18*d* which is exactly parallel to an inner surface 5*a* of the frame member 5 which, in turn, is parallel to the length of the document support plate 3. This structure shown in FIG. 4, though not using a lid member 9, makes it possible to properly place each of a book BD and a sheet SD, as a document, on the document support platen 3, and to allow the modified scanner 1 to scan and read the either document without any problem.

More specifically, referring to FIG. 4, for scanning and reading a book BD as a document, a user inserts one part of the book BD into the insertion pocket 18 through the exposed slit opening 16 at the open position of the cover member 6, with a desired page in the other part of the book BD in intimate contact with the document support platen 3. The user then closes the cover member 6, and presses a predetermined one of the operation keys 15 for the modified scanner 1 to perform a reading operation. On the other hand, for scanning and reading a sheet SD as a document, the user places the sheet SD at a proper position on the document support platen 3 by contacting two sides (or at least one side) of the sheet SD, respectively, to one of the inner surfaces 5*a* of the frame member 5 and/or to the elongated outer surface 18*d* of the one side wall 18*a* of the insertion pocket 18 positioned on the glass plate of the document support platen 3.

The user then closes the cover member 6, and presses a predetermined one of the operation keys 15 for the modified scanner 1 to perform a reading operation. Thus, the modified scanner 1 shown in FIG. 4, which does not have a lid member to cover the slit opening 16, can scan and read a document, either a book BD or a sheet SD, with the cover member 6 being closed without being obstructed by a lid member. This enables more intimate contact of the document to the document support platen 3, and allows light to be reflected even from an area of the cover member 6 around the document when scanning and reading the document.

Figure 5:
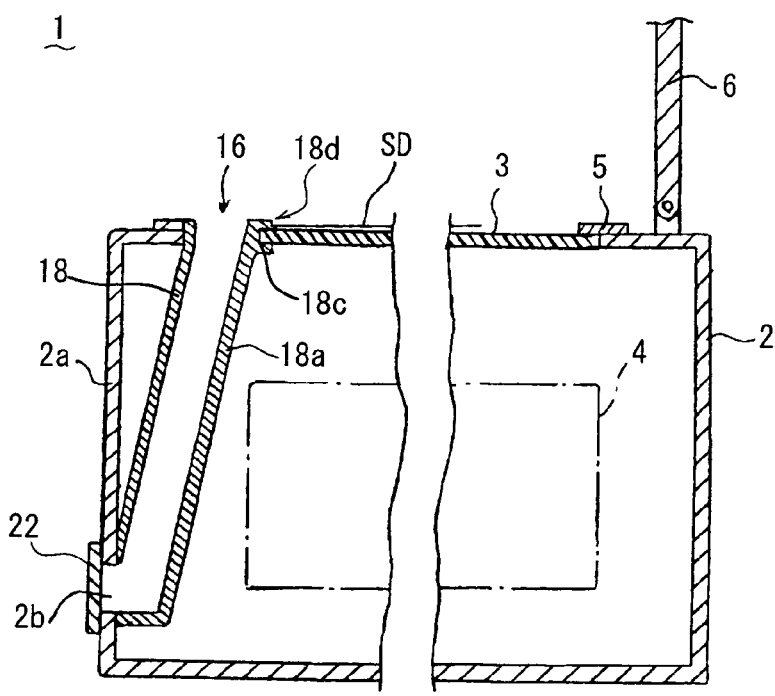
FIG. 5 is a schematic cross-sectional view of a part of a further modified scanner according to a still further embodiment of the present invention, which is modified in the way of e.g. forming an insertion pocket.

An example of a further modified scanner 1 according to a still further embodiment of the present invention is shown in FIG. 5 which is further modified in the way of e.g. forming an insertion pocket 18. FIG. 5 is a schematic cross-sectional view of a part of the further modified scanner 1. Referring to FIG. 5, the further modified scanner 1 has a slit opening 16 on a front part (left part in FIG. 5 where a user is located) of the document support platen 3, and has an insertion pocket 18 which is inclined relative to the vertical, i.e. extends diagonally downward, to stay away from a document reading unit 4. The insertion pocket 18 is contiguous with the slit opening 16 at an end (upper end) thereof, and is connected at the other end (lower end) thereof to a front face 2*a* of a housing 2. The other end of the insertion pocket 18 is an opening 2*b* which is covered by an openable cover 22 provided on the front face 2*a* of the housing 2.

One side wall 18a of the insertion pocket 18 of the further modified scanner 1 is formed to have a U-shaped cross section 18c at an end thereof into which an end periphery of the glass plate of the document support platen 3 is fit. The further modified scanner 1 is the same as the modified scanner 1 described above with reference to FIG. 4, except that the insertion pocket 18 of the further modified scanner 1 is modified in the way described here, and that the housing 2 of the further modified scanner is modified in the way described here to adapt to the insertion pocket 18. Here, one leg of the U-shaped cross section of the one side wall 18a of the insertion pocket 18 on the upper surface of the glass plate of the document support platen 3, that is an upper elongated segment of the cross-sectionally U-shaped end of the one side wall 18a, is formed to have an elongated outer surface 18d which is exactly parallel to an inner surface 5a of the frame member 5 which, in turn, is parallel to the length of the document support platen 3.

Similarly as with the modified scanner 1 shown in FIG. 4, for scanning and reading a sheet SD as a document, a user using the further modified scanner 1 shown in FIG. 5 can easily place the sheet SD at a proper position on the document support platen 3 by contacting two sides (or at least one side) of the sheet SD, respectively, to one of the inner surfaces of the frame member 5 and/or to the elongated outer surface 18d of the one side wall 18a of the insertion pocket 18 positioned on the glass plate of the document support platen 3. The user then closes the cover member 6, and presses a predetermined one of the operation keys for the further modified scanner 1 to perform a reading operation. Thus, the further modified scanner 1 shown in FIG. 5 can scan and read a document, either a book or a sheet SD, with the cover member 6 being closed without being obstructed by a lid member.

Furthermore, the opening 2b at the lower end of the insertion pocket 18 is covered by the openable cover 22 as described above. Accordingly, even if the sheet SD erroneously falls into the insertion pocket 18, the sheet SD can be easily taken out from the insertion pocket 18 by opening the openable cover 22. In addition, the inside of the insertion pocket 18 can be easily cleaned through the opening 2b.

It is to be noted that although certain embodiments of the present invention have been described above, various modifications are possible. For example, each of the above embodiments shows a scanner as an example of the document reading apparatus. However, the technical concept of the document reading apparatus shown using the scanner can also be applied to other image processing apparatus such as a printer and a copier.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A document reading apparatus for reading a document, comprising:
    a housing;
    a document support platen formed of a transparent glass plate provided on an upper surface of the housing for supporting a document;
    a document reading unit provided under the document support platen in the housing for reading the document placed on the document support platen;
    a slit opening into which one part of an opened book, as the document is insertable, and which is formed along and between one side of the housing and one side of the document support platen; and
    an openable lid member which is provided at the slit opening, and which has a shape corresponding to the slit opening, and further has a rim to position a document,
    wherein the lid member is operable between an open position to expose the slit opening and a closed position to cover the slit opening, such that in the open position of the lid member, one part of a book as the document is insertable into the slit opening with a page in the other part of the book being in intimate contact with the document support platen, while in the closed position of the lid member, a sheet as the document can be placed at a proper position on the document support platen by contacting one side of the sheet to the rim of the lid member.

2. The document reading apparatus according to claim 1, further comprising an insertion pocket forming a recessed space which is contiguous with the slit opening at one end thereof, and which is inclined relative to the vertical to stay away from the document reading unit.

* * * * *